(12) United States Patent
Ritt, Jr.

(10) Patent No.: US 9,597,793 B2
(45) Date of Patent: Mar. 21, 2017

(54) OBJECT RETRIEVAL DEVICE

(71) Applicant: Michael J Ritt, Jr., Glenview, IL (US)

(72) Inventor: Michael J Ritt, Jr., Glenview, IL (US)

( * ) Notice: Subject to any disclaimer, the term of this patent is extended or adjusted under 35 U.S.C. 154(b) by 0 days.

(21) Appl. No.: 14/923,459

(22) Filed: Oct. 27, 2015

(65) Prior Publication Data

US 2016/0354922 A1 Dec. 8, 2016

Related U.S. Application Data

(60) Provisional application No. 62/170,691, filed on Jun. 4, 2015.

(51) Int. Cl.
*B66F 19/00* (2006.01)
*B25J 1/04* (2006.01)
*B25J 15/00* (2006.01)

(52) U.S. Cl.
CPC .............. *B25J 1/04* (2013.01); *B25J 15/0019* (2013.01); *B25J 15/0028* (2013.01); *B25J 15/0095* (2013.01)

(58) Field of Classification Search
CPC .... E01H 1/1206; A01K 23/005; A01K 97/14; A01K 97/00; B65G 7/12; A61F 13/105; A47J 45/10; B25J 1/04; B25J 7/00; B25B 9/02; B25B 9/00; A61B 17/29; A61B 17/0469; A61B 17/122; A61B 17/062
USPC ....... 294/16, 1.4–1.5, 19.3, 24–25, 28, 99.1, 294/99.2, 115; 43/4; 606/205–207, 139, 606/157, 147, 144, 148, 208
See application file for complete search history.

(56) References Cited

U.S. PATENT DOCUMENTS

| | | | | |
|---|---|---|---|---|
| 848,126 A * | 3/1907 | Roosevelt | ............ | A61B 17/122 606/157 |
| 3,277,895 A * | 10/1966 | Johnson | ............. | A61B 17/2812 606/118 |
| 4,666,451 A * | 5/1987 | Samaria | .................... | A61F 4/00 294/25 |
| 5,147,373 A * | 9/1992 | Ferzli | ................. | A61B 17/0469 606/144 |
| 5,158,563 A * | 10/1992 | Cosman | .................... | A61B 1/31 606/140 |
| 5,730,747 A * | 3/1998 | Ek | ....................... | A61B 17/0469 606/139 |
| 6,159,224 A * | 12/2000 | Yoon | ................... | A61B 17/0469 606/139 |
| 6,238,414 B1 * | 5/2001 | Griffiths | ................. | A61B 17/29 606/205 |
| 7,758,608 B2 * | 7/2010 | DiCesare | ........... | A61B 17/2909 606/1 |

* cited by examiner

*Primary Examiner* — Stephen Vu

(57) ABSTRACT

An object retrieval device and associated methods of operation and manufacture are disclosed. In certain embodiments, the object retrieval device comprises a grasping member having one or more elongated members integrally formed therein. The grasping member can be coupled to an elongated support member. In turn, the elongated support member can support an elongated actuator allowing actuation of the grasping member.

11 Claims, 2 Drawing Sheets

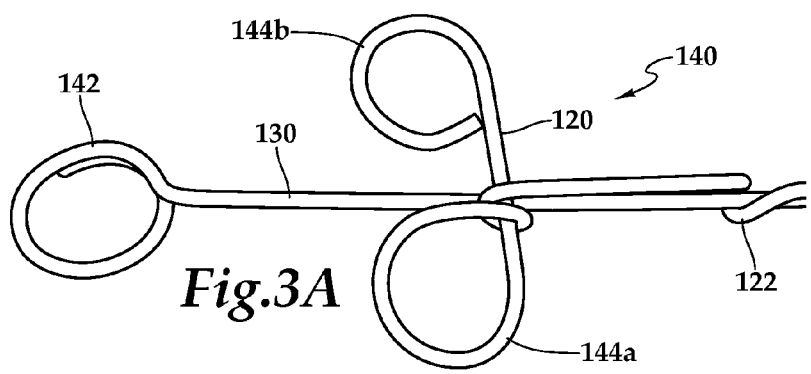
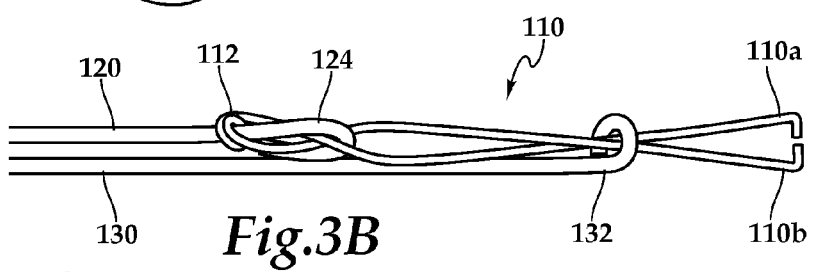
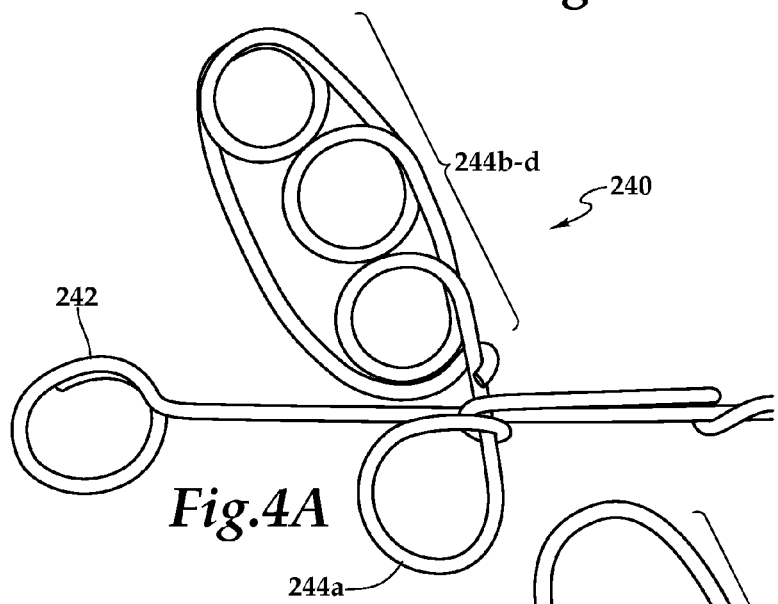
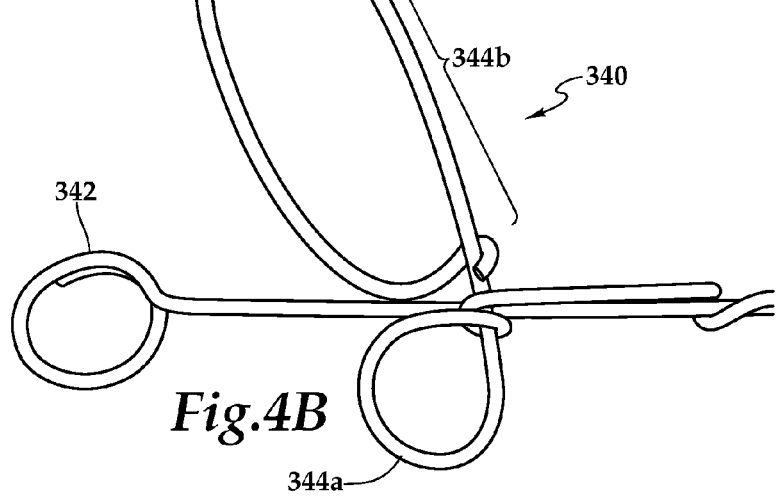

OBJECT RETRIEVAL DEVICE

CROSS-REFERENCE TO RELATED APPLICATIONS

The present application claims priority on U.S. provisional patent application No. 62/170,691 filed on Jun. 4, 2015.

BACKGROUND OF THE INVENTION

In workplace and household settings, there is often a need to retrieve objects which are ordinarily not easily retrievable due to their size and/or inaccessible location. For example, small objects may be dropped into areas (e.g. under automobile seats, kitchen appliances, furniture etc.) that are not accessible by the human hand due to physical constraints or safety concerns, thus requiring a means of retrieving the objects without strenuous exertion or risk of injury.

Additionally, large demographics of the general population struggle with limited or diminishing physical ability to accomplish ordinary tasks using fine or gross motor skills. For example, individuals having physical limitations due to age or infirmity often struggle with tasks involving the retrieval of small and/or inaccessible objects. Further, such individuals face a serious safety concern when confronted with such tasks, thus requiring the means of accomplishing these tasks without strenuous exertion or risk of injury.

BRIEF SUMMARY OF THE INVENTION

The present invention relates to devices for retrieving objects and methods of operation and manufacture of such devices. More specifically, the devices comprise hand-actuated devices for retrieving objects located proximate a user, where the objects are otherwise not easily retrievable due to the user's limited physical ability, the remote/inaccessible location of the objects, and/or the size/shape of the objects. In various aspects, the present invention comprises an object retrieval device for retrieving small and/or inaccessible objects. In certain embodiments, the object retrieval device comprises a grasping member having one or more elongated members integrally formed therein, wherein the grasping member is coupled to an elongated support member. In turn, the elongated support member supports an elongated actuator allowing actuation of the grasping member.

In certain embodiments, the object retrieval device comprises one or more gripping members allowing a user to grip the object retrieval device, wherein the one or more gripping members may be integrally formed with at least one of the elongated support member and the elongated actuator. Each of the one or more gripping members may take the form of apertures sized to accommodate the user's fingers. Further, each of the one or more gripping members may comprise a high-friction material to allow user a firm grip.

In certain embodiments, the one or more elongated members of the grasping member may comprise a high-friction material and/or a magnetic material allowing increased ease of object retrieval. Further, the one or more elongated members may comprise removably-coupled distal tips having a high-friction material and/or a magnetic material allowing increased ease of object retrieval. Further, the removably-coupled distal tips may be stowed in a complimentary storage unit, wherein removal and replacement of the distal tips are accomplished via interaction with the complimentary storage device.

In certain embodiments, the object retrieval device may be made of a pliable material allowing the user to temporarily and/or semi-permanently bend the aforementioned members of the object retrieval device at desired angles during use. Further, the aforementioned members may comprise a material which reduces friction caused by movement between respective members. Further, one or more of the aforementioned members may comprise a magnetic material allowing for ease of storage with a complimentary magnetic material.

BRIEF DESCRIPTION OF THE DRAWINGS

FIG. 3A illustrates a detailed view of the integral formation of the grasping member with the associated elongated members as well as with the elongated support member and elongated actuator according to the preferred embodiment of the object retrieval device.

FIG. 3B illustrates a detailed view of the integral formation of the gripping member with the elongated support member and elongated actuator according to the preferred embodiment of the object retrieval device.

FIG. 4A illustrates a detailed view of the gripping member accommodating the entirety of a user's hand according to an alternative embodiment of the object retrieval device.

FIG. 4B illustrates a detailed view of the gripping member accommodating the entirety of a user's hand according to an alternative embodiment of the object retrieval device.

DETAILED DESCRIPTION

Before describing the present invention in detail, it is to be understood that the invention is not limited to any one of the particular embodiments, which of course may vary. It is also to be understood that the terminology used herein is for the purpose of describing particular embodiments only, and therefore is not necessarily intended to be limiting. As used in this specification and the appended claims, terms in the singular and the singular forms "a," "an," and "the" include plural referents unless the context clearly dictates otherwise. Thus, for example, reference to "an object retrieval device," also includes a plurality of object retrieval devices, and the like.

Figure 1:
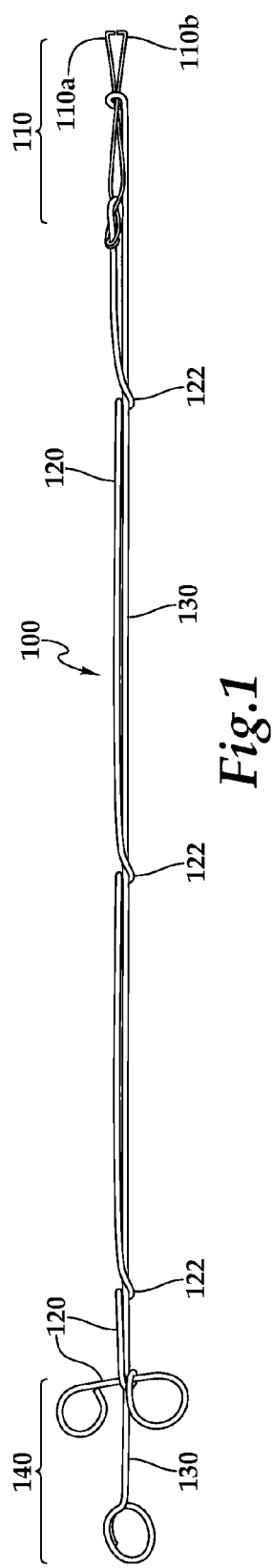
FIG. 1 illustrates a preferred embodiment of the object retrieval device.

Exemplary embodiments of the present invention are illustrated in the accompanying figures. FIG. 1 illustrates a preferred embodiment of an object retrieval device 100, including grasping member 110, elongated support member 120, elongated actuator 130 and gripping member 140. Specifically, grasping member 110 may comprise elongated members 110a, 110b which may be formed to retain articles therebetween at a distal end of the object retrieval device 100. While only two elongated members are depicted, it may be advantageous to utilize more than two elongated members for increased grasping capabilities. Further, elongated members may comprise a magnetic and/or high-friction material for ease of maintaining grasping control of one or more articles.

Elongated support member 120 may be mechanically coupled to grasping member 110 at a distal end. While a parallel closed loop is shown as the means of mechanical coupling, any arrangement of mechanical coupling may be employed. Elongated support member 120 may be formed to comprise a plurality of partially open retaining loops 122 along its length. While three retaining loops 122 are depicted, it is contemplated that fewer or additional retaining loops may be utilized to accommodate a shorter or longer support member 120 length.

Elongated actuator 130 may be movably retained along the length of support member 120 via retaining loops 122. Movement of actuator 130 may be confined to one or more degrees of freedom via retaining loops 122. Actuator 130 may have an orthogonal closed loop formed at a distal end of actuator to partially confine elongated members 110a, 110b. While an orthogonal closed loop is shown as the means of retention, any arrangement of mechanical confinement may be employed.

Gripping member 140 may comprise means for a user to grip and actuate the object retrieval device 100. Gripping member 140 may be partially defined by each of the proximate ends of support member 120 and actuator 130. Portions of the gripping member 140 may be movable with respect to one another in order to execute actuation of the object retrieval device 100. Gripping member 140 may comprise a high-friction material to assist user in achieving a firm grip of gripping member for further ease of use of the object retrieval device.

Figure 2A:
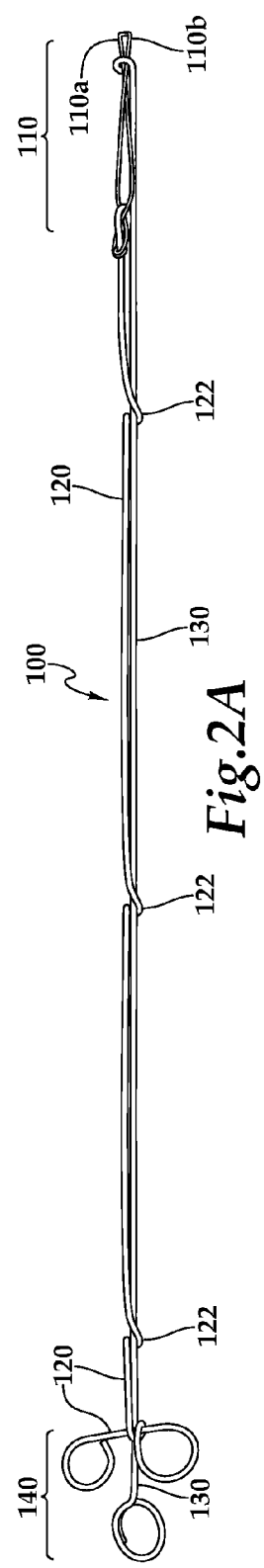
FIG. 2A illustrates user interaction with the gripping members of the preferred embodiment of the object retrieval device in a non-actuated state.

FIG. 2A illustrates the object retrieval device 100 in a non-actuated state. Using gripping member 140, user may manipulate the distal end of actuator 130 to further confine elongated members 110a, 110b. User may utilize the non-actuated state for purposes of maintaining grasping control of an article between elongated members 110a, 110b. Further, user may utilize the non-actuated state for purposes of storage of object retrieval device 100 when not in use. In an exemplary embodiment, object retrieval device 100 may be made of a material conducive to magnetic storage, but any suitable material may be employed.

Figure 2B:
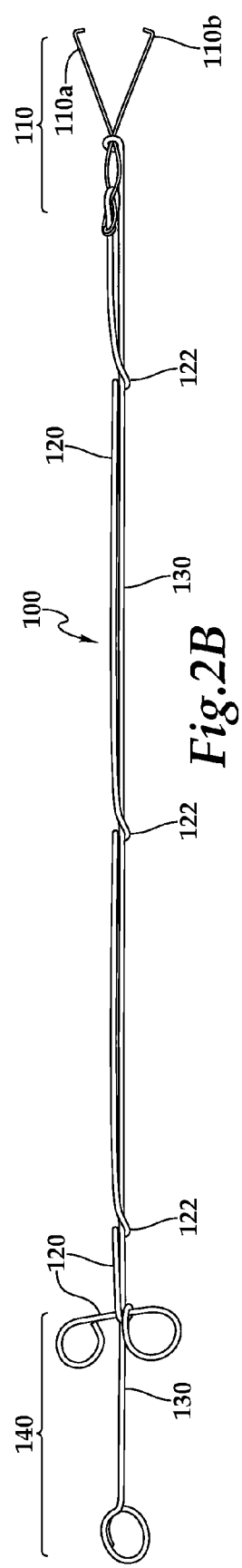
FIG. 2B illustrates user interaction with the gripping members of the preferred embodiment of the object retrieval device in an actuated state.

FIG. 2B illustrates the object retrieval device 100 in an actuated state. Using gripping member 140, user may manipulate the distal end of actuator 130 to open space between elongated members 110a, 110b. User may utilize the actuated state for purposes of initiating grasping control of an article within the space between elongated members 110a, 110b. Further manipulation of distal end of actuator 130 via gripping member 140 may allow transition of elongated members 110a, 110b back to non-actuated state of FIG. 2A. During this transition, the article within the space between elongated members 110a, 110b may be put into complete grasping control.

FIG. 3A illustrates a detailed view of the gripping member 140 and its component parts. Gripping member 140 may comprise a proximate gripping loop 142 and a plurality of distal gripping loops 144a, 144b. Gripping loop 142 may be defined by a closed loop at the termination of the distal end of actuator 130. Gripping loops 144a, 144b may be defined by closed loops at the termination of the distal end of support member 120. Both the proximate and distal gripping loops may be utilized by the user to transition the object retrieval device 100 between the actuated and non-actuated states. Each gripping loop may individually comprise a high-friction material to assist user in achieving a firm grip of gripping member for further ease of use of the object retrieval device.

FIG. 3B illustrates a detailed view of the grasping member 110 and its component parts. Grasping member 110 may comprise elongated members 110a, 110b which may be coupled to support member 120 via double closed loop coupling 112 around parallel closed loop 124 formed at distal end of support member. While a double closed loop and parallel closed loop are depicted as the coupling means, any suitable arrangement of mechanical coupling may be employed. Further, as described in FIG. 1, elongated members 110a, 110b of grasping member 110 may be confined and manipulated via an orthogonal closed loop 132 formed at the distal end of actuator 130.

FIG. 4A illustrates a detailed view of a gripping member 240 accommodating the entirety of a user's hand according to an alternative embodiment of the object retrieval device 100. Gripping member 240 may comprise a proximate gripping loop 242 and a plurality of distal gripping loops 244a-d. Gripping loops 244b-d may be formed with an arch complementary to the natural arch of user's hand. Further, each gripping loop may be customized and/or adjusted to fit any set of user hand dimensions. FIG. 4B is similar to FIG. 4A and illustrates a detailed view of a gripping member 340 accommodating the entirety of a user's hand according to an alternative embodiment of the object retrieval device 100. Gripping member 340 may comprise a proximate gripping loop 342 and a plurality of distal gripping loops 344a-b. Gripping loop 344b may be designed to accommodate a plurality of user's fingers and may be formed with an arch complementary to the natural arch of user's hand.

While various details of the object retrieval device 100 have been described in the preceding paragraphs, it should be understood that additional features may generally accompany the object retrieval device. For instance, while the object retrieval device is depicted as comprising three main structural members in the form of grasping member, support member, and actuator which make up the unitary whole, object retrieval device may be comprise one or more main structural members. Further, each of the structural members may comprise a low-friction material, thereby assisting user actuation of the object retrieval device.

Additionally, each structural member of object retrieval device may comprise material providing high flexibility or rigidity, may have a length on the scale of centimeters to several meters, and may have a gauge or thickness on the scale of microns to several centimeters. Further, each structural member may comprise one or more flexible hinges along its length, thereby allowing user to customize orientation of the object retrieval device to probe a variety of dimensionally-irregular environments. Dimensionally-irregular environments may be encountered in any variety of residential and work-related settings, such as crevices located around appliances, furniture, vehicles and the like. Further, each structural member may comprise a means of adjusting its length in a telescoping manner, thereby allowing user to variably select the desired length of the object retrieval device and allowing increased portability and ease of storage via the variably reduced length.

Additionally, elongated members of grasping member may comprise a plurality of interchangeable tips or jackets allowing ease of user initiating and maintaining grasping control of one or more articles between elongated members. Each tip or jacket may comprise material having high-surface friction, magnetic properties, and/or dimensions conducive to initiating and maintaining grasping control of each article. Further, each tip or jacket may be stowable in a complimentary storage unit that may be physically distinct from object retrieval device. Storage unit may facilitate automatic or assisted interchanging of one tip or jacket for another upon the distal end of elongated members.

While the foregoing invention has been described in some detail for purposes of clarity and understanding, it will be clear to one skilled in the art from a reading of this disclosure that various changes in form and detail can be made without departing from the true scope of the invention. For example, all the techniques and apparatuses described in the above embodiments may be used in various combinations.

The invention claimed is:

1. An object retrieval device, comprising:
a plurality of gripping apertures adjacent and substantially coplanar with one another;
a first elongate member operably coupled to a second elongate member, wherein the first elongate member is integrally formed with a first portion of the plurality of gripping apertures forming a first unitary structural member and the second elongate member is integrally formed with a second portion of the plurality of gripping apertures forming a second unitary structural member that is operably coupled to the first unitary structural member;
a first grasping member integrally formed with a second grasping member forming a third unitary structural member that is operably coupled to the first and second unitary structural members at a distal end opposite the plurality of gripping apertures, wherein the plurality of gripping apertures and the first and second elongate members have a cylindrical cross-section structurally throughout, and the first and second grasping members have a cylindrical cross-section structurally throughout; and
the first unitary structural member, the second unitary structural member, and the third unitary structural member are movable relative one another in response to a user actuation, wherein the first and second grasping members of the third unitary structural member are movable relative one another.

2. The object retrieval device of claim 1, wherein:
the user actuation comprises a user actuating the plurality of gripping apertures by inserting one of the user's digits into each of the plurality of gripping apertures, respectively; and
the user actuation further comprises displacement of the first portion of the plurality of gripping apertures relative to the second portion of the plurality of gripping apertures, wherein the displacement is responsive to force applied by the user's digits upon the plurality of gripping apertures.

3. The object retrieval device of claim 1, wherein the user actuation comprises a user actuating the plurality of gripping apertures by inserting one of the user's digits into each of the plurality of gripping apertures, respectively.

4. The object retrieval device of claim 1, wherein the user actuation further comprises displacement of a first portion of the plurality of gripping apertures relative to a second portion of the plurality of gripping apertures.

5. The object retrieval device of claim 4, wherein the displacement is responsive to force applied by the user's digits upon the plurality of gripping apertures.

6. The object retrieval device of claim 1, wherein the plurality of gripping apertures are positioned relative one another to match a digit spacing and curvature of a user's hand.

7. A method of operating an object retrieval device, the method comprising:
inserting one of a user's digits into each of a plurality of gripping apertures, respectively, wherein the plurality of gripping apertures are adjacent and substantially coplanar with one another; and
displacing a first portion of the plurality of gripping apertures relative to a second portion of the plurality of gripping apertures, wherein the displacing causes a first elongate member, a second elongate member, a first grasping member and a second grasping member to move relative one another, wherein the first elongate member is operably coupled to the second elongate member, and the first elongate member is integrally formed with the first portion of the plurality of gripping apertures forming a first unitary structural member and the second elongate member is integrally formed with the second portion of the plurality of gripping apertures forming a second unitary structural member that is operably coupled to the first unitary structural member, and the first grasping member is integrally formed with the second grasping member forming a third unitary structural member that is operably coupled to the first and second unitary structural members at a distal end opposite the plurality of gripping apertures, and wherein the plurality of gripping apertures and the first and second elongate members have a cylindrical cross-section structurally throughout, and the first and second grasping members have a cylindrical cross-section structurally throughout.

8. The method of operating the object retrieval device of claim 7, wherein:
the relative movement between the first grasping member and the second grasping member secures an article between the first and second grasping member.

9. The method of operating the object retrieval device of claim 8, wherein securing the article involves magnetic attraction between the article and a magnetic material of at least the first or second grasping member, wherein the magnetic material is removably secured to at least the first or second grasping member.

10. The method of operating the object retrieval device of claim 8, wherein displacing the first and second portions of the plurality of gripping apertures in a reverse direction releases the article from securement by the first and second grasping member.

11. The method of operating the object retrieval device of claim 4, further comprising: magnetically stowing the object retrieval device after the article is released from securement, wherein the object retrieval device comprises a metallic material conducive to magnetically stowing the object retrieval device against a complimentary magnetic material that is magnetically attracted to the metallic material of the object retrieval device.

* * * * *